J. B. Cornell.

Vault Cover.

N° 17,198.    Patented May 5, 1857.

UNITED STATES PATENT OFFICE.

JOHN B. CORNELL, OF NEW YORK, N. Y.

VAULT-COVER.

Specification of Letters Patent No. 17,198, dated May 5, 1857.

*To all whom it may concern:*

Figure 2:
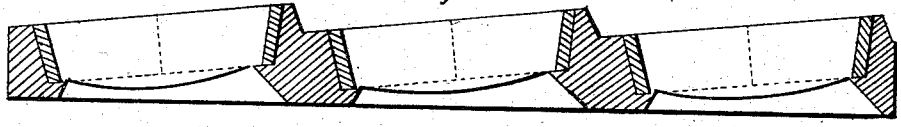

Be it known that I, JOHN B. CORNELL, of the city, county, and State of New York, have invented a new and useful Improvement in Illuminating Vault-Covers; and I do hereby declare that the following is a full and exact description thereof, reference being had to the accompanying drawings, making a part of this specification, Figure 1 being a top view of a portion of one of my improved vault-covers, and Fig. 2 a section in the line A B of Fig. 1.

My said improvement in illuminating vault-covers consists in so shaping the metallic portions thereof that the upper surface of each glass in a vault-cover will be at a sufficient inclination with the base of said cover to cause the water falling upon it to run off freely when said cover is placed in a horizontal position, or nearly so, in a pavement.

Figure 1:
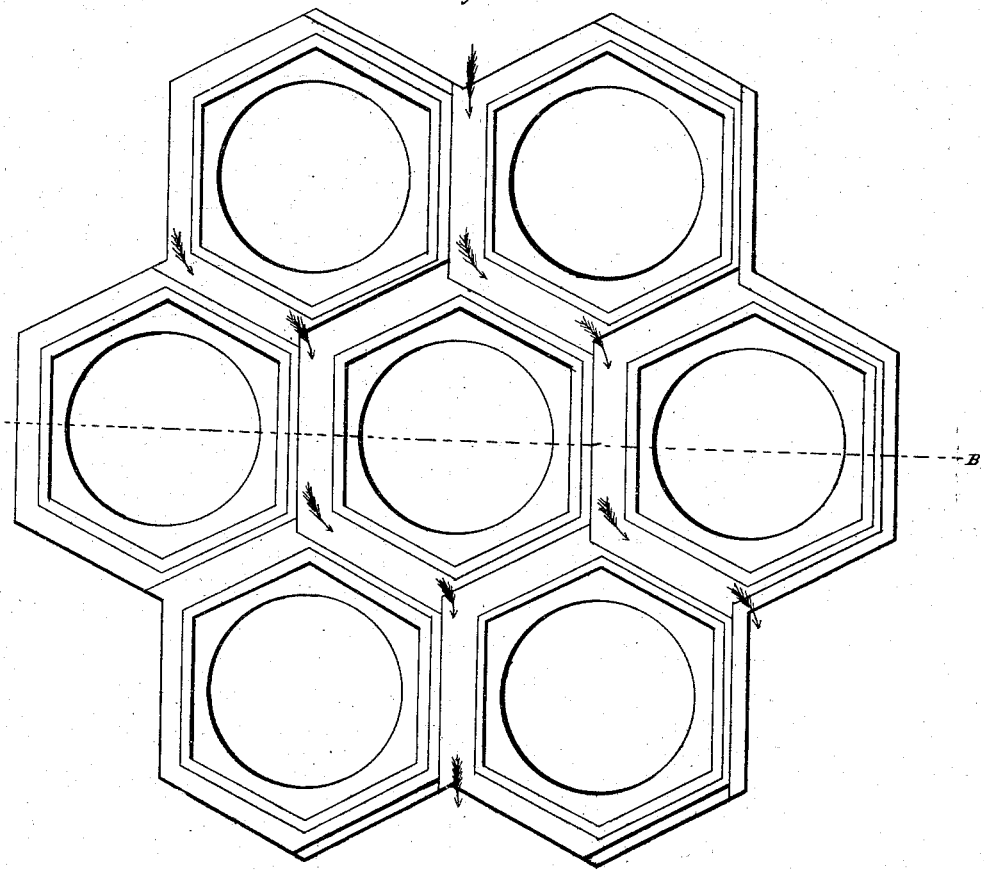

The angular spaces between the depressed edges of one tier of glasses in my improved vault-cover and the elevated edges of the next tier of glasses therein form channels for the water to flow into from the faces of said glasses, and which also serve to conduct the water outward and discharge the same from the face of the cover in the direction indicated by the arrows in Fig. 1.

By placing this my improved illuminating vault-cover in such a position that the depressed edges of its glasses will be nearest to the curb-stone the inclined position of its glasses will cause the light passing through them to be refracted a much greater distance into the interior of the vaulted apartment, over which it is placed, than would be the case if the faces of said glasses were arranged in the ordinary manner with their faces parallel with the base of the metallic portion of said illuminating cover.

This improvement is applicable to vault-covers whose glasses are of a circular shape, and also to those of any other form of glasses.

What I claim as my invention and desire to secure by Letters Patent, is—

Arranging the respective glasses, or tiers of glasses, in an illuminating vault-cover in inclined positions to be the straight base of said cover, substantially as herein represented and described and for the purposes set forth.

JOHN B. CORNELL.

Witnesses:
   Jos. W. MANTERSTOCK,
   THOS. CROCKER.